US010208912B2

(12) United States Patent
Taudt et al.

(10) Patent No.: US 10,208,912 B2
(45) Date of Patent: Feb. 19, 2019

(54) HEADLIGHT FOR A VEHICLE

(71) Applicant: ZKW Group GmbH, Wieselburg (AT)

(72) Inventors: Lukas Taudt, Wieselburg (AT);
Irmgard Krenn, Purgstall/Erlauf (AT);
Josef Plank, Purgstall/Erlauf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 15/772,904

(22) PCT Filed: Dec. 7, 2016

(86) PCT No.: PCT/AT2016/060118
§ 371 (c)(1),
(2) Date: May 2, 2018

(87) PCT Pub. No.: WO2017/106891
PCT Pub. Date: Jun. 29, 2017

(65) Prior Publication Data
US 2018/0328562 A1  Nov. 15, 2018

(30) Foreign Application Priority Data

Dec. 21, 2015 (AT) .............. A 51088/2015

(51) Int. Cl.
*B60Q 1/04* (2006.01)
*F21S 41/663* (2018.01)
(Continued)

(52) U.S. Cl.
CPC .............. *F21S 41/663* (2018.01); *B60Q 1/04* (2013.01); *F21S 41/143* (2018.01); *F21S 41/24* (2018.01); *F21S 41/25* (2018.01); *F21W 2102/19* (2018.01)

(58) Field of Classification Search
CPC ........ F21S 41/663; F21S 41/143; F21S 41/24; F21S 41/25; F21S 43/15; F21S 43/235;
(Continued)

(56) References Cited

U.S. PATENT DOCUMENTS

| 2006/0044825 A1* | 3/2006 | Sa .................. B60Q 1/0058 362/600 |
| 2015/0226395 A1* | 8/2015 | Taudt .................. F21S 41/24 362/511 |

(Continued)

*Primary Examiner* — Joseph L Williams
*Assistant Examiner* — Jose M Diaz
(74) *Attorney, Agent, or Firm* — Eversheds Sutherland (US) LLP

(57) ABSTRACT

A headlamp (1) for a vehicle, comprising at least one light source (2), a primary optical system (3) for generating a lighting image, and an optical imaging system (4), wherein the lighting image can be projected onto the roadway as a light image by means of the optical imaging system (4), and the primary optical system (3) has a plurality of light guiding elements (5) and a support layer (6), wherein the light guiding elements (5) are arranged on a rear face (6r) of the support layer (6), and the lighting image can be generated on a front face (6v) of the support layer (6), the light guiding elements (5) are arranged adjacently to one another or in an overlapping manner in a row in an axis direction (y) and form at least one line (7), wherein each light guiding element (5) has a light inlet surface (5e) for coupling in light from at least one light source (2) and a light outlet surface (5a) for coupling out light, wherein the totality of the light guiding elements (5) of the at least one line (7) have a common border (8) which is constantly curved on at least one face oriented substantially along the axis direction (y) and together with the support layer (6) forms a section curve with a curved curve course (9, 10).

11 Claims, 4 Drawing Sheets

Figure 1:
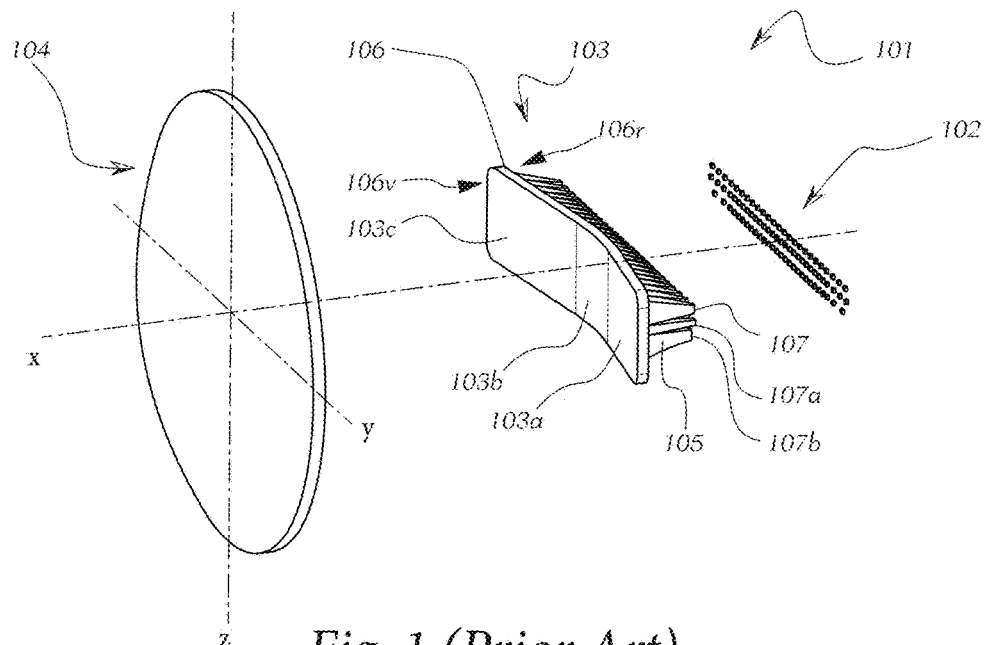

(51) Int. Cl.
*F21S 41/143* (2018.01)
*F21S 41/25* (2018.01)
*F21S 41/24* (2018.01)
*F21W 102/19* (2018.01)

(58) Field of Classification Search
CPC .......... F21S 43/249; B60Q 1/04; B60Q 1/00; B60Q 1/0047; B60Q 1/02; B60Q 1/24; B60Q 1/26; B60Q 1/2607; F21W 2102/19
See application file for complete search history.

(56) References Cited

U.S. PATENT DOCUMENTS

| | | | |
|---|---|---|---|
| 2016/0146419 A1* | 5/2016 | Reinprecht | F21S 41/16 362/512 |
| 2018/0264994 A1* | 9/2018 | Stoehr | B60Q 1/0408 |
| 2018/0299092 A1* | 10/2018 | Orisich | G02B 6/001 |
| 2018/0306959 A1* | 10/2018 | Schwaiger | G02B 6/0013 |

* cited by examiner

HEADLIGHT FOR A VEHICLE

The invention relates to a headlamp for a vehicle, comprising at least one light source, a primary optical system for generating a lighting image, and an optical imaging system, wherein the lighting image can be projected onto the roadway as a light image by means of the optical imaging system, and the primary optical system has a plurality of light guiding elements and a support layer, wherein the light guiding elements are arranged on a rear face of the support layer, and the lighting image can be generated on a front face of the support layer, the light guiding elements are arranged adjacently to one another or in an overlapping manner in a row in an axis direction and form at least one line, wherein each light guiding element has a light inlet surface for coupling in light from at least one light source and a light outlet surface for coupling out light.

In the development of the current headlamp systems, the desire to be able to project a light image of the highest possible resolution onto the roadway, which light image can be quickly changed and adapted to the corresponding traffic, road and light conditions, is becoming an increasingly important factor. The term "roadway" is used here by way of simplified representation, because it is of course dependent on the local conditions as to whether a light image is actually disposed on the roadway or also extends therebeyond. In principle, the light image in the sense used here corresponds to a projection onto a vertical surface in accordance with the appropriate standards relating to motor vehicle illumination technology.

In order to meet the aforesaid requirement, headlamps inter alia have been developed which form a lighting matrix from a plurality of individual emitters. Lighting devices of this kind, which are also referred to as "pixel lights", are usual in vehicle construction and are used for example for the imaging of glare-free main beam light in that the light is generally emitted from a plurality of light sources and is bundled in the radiation direction by a corresponding plurality of adjacently arranged light guides (attachment optical system/primary optical system). The light guides have a relatively small, funnel-shaped cross-section and therefore emit the light of the individual light sources assigned thereto in a very concentrated manner in the radiation direction. The light guides forward the light from the light sources to a position, which is as well approximated as possible, in a spatially curved plane referred to as the Petzval plane of the optical imaging system arranged ahead.

Pixel headlamps are very flexible in respect of the light distribution, since the illuminance can be individually controlled for each pixel, that is to say for each light guide, and any light distributions can be produced, for example a dipped-beam-light light distribution, a turning-light light distribution, a town-light light distribution, a motorway-light light distribution, a cornering-light light distribution or a main-beam-light light distribution.

AT 513 738 B1 describes headlamp systems in the name of the applicant which project the light of a large number of light-emitting diodes (LEDs) in the form of a light image onto the roadway by means of projection systems comprising individual lenses, wherein the brightness of the individual LEDs, which are controlled from a central computing unit, can be individually adjusted or changed.

In addition to the variable illuminance, the geometry of the light guide elements can be used to influence light images.

DE 10 2012 213 845 A1 discloses an illumination device for vehicle headlamps comprising a primary optical system of which the light guide elements are formed in such a way that the intensity in the longitudinal direction of the outlet surface is varied. Here, identical light guide elements are provided within a primary optical system.

The number of light sources within the lighting matrix of a headlamp determines the resolution of the light image and the level of detailing with which, within a light distribution, regions either can be selectively masked out or illuminated to a greater or lesser extent. For example, oncoming vehicles on a roadway can be selectively masked out so as not to dazzle them, or road signs can be selectively illuminated more intensely so as to increase their readability. In principle, within a light distribution, a higher resolution is usually required in the region of the centre of the light distribution, that is to say in front of the vehicle, than at the edge of the light distribution, that is to say at the edge of the road. The number of light sources thus often decreases from the centre towards the edge. At the same time, the intensity maximum of the light distribution is usually provided in the centre of the light distribution and decreases towards the edge. For example, this results in an enlargement of the light outlet surfaces from the middle of an illumination row towards the edge, so as to take account of this desired brightness reduction.

The total projection arrangement consists of light source, the primary optical system, and an optical imaging system (projection lens). The optical imaging system can lead to distortions depending on design. The distortion is a geometric imaging error of optical systems, which leads to a local change of the imaging scale. The change of scale is based on a change of the enlargement with increasing distance of the pixel from the optical axis. The distortion is therefore rotationally symmetrical about a point which is also referred to as the distortion centre. The cause of the distortion lies with diaphragms that narrow the beam bundle of the imaging before or after the main plane of an optical system with spherical aberration. If the enlargement increases at the edges of the image field, a square is distorted in a cushion-like manner. In the reverse case, reference is made to a barrel-like distortion. Distortions of higher order can also occur, and the superimposition of different orders can lead to a wave-like imaging of straight lines ("wave-like distortion").

Distortions manifest themselves in the light image of a headlamp in the form of undesirable curvatures or illumination of regions falling outside the lighting regions that are admissible in the case of road traffic, for example above the light-dark boundary.

The measurement of the distortion is known in accordance with DIN ISO 9039: Optics and Photonics—Quality Evaluation of Optical Systems—Determination of Distortion (ISO 9039:2008).

AT 511 760 A1 discloses the selective trimming of the light image by means of an additional diaphragm, in order to cut off the cushion-like distortion occurring as a result of the optical imaging system. Here, however, diaphragms destroy light generated in a complex manner, thus reduce the efficiency of the headlamp, and form a further component in the headlamp that results in additional production costs and requires additional installation space in the headlamp. A further disadvantage when using diaphragms is the resultant diffraction and the dependency thereof on the wavelength.

In the currently known, above-mentioned lighting devices in the name of the applicant, a two-dimensional row-like arrangement of the light sources, typically LEDs, is used in order to generate a segmented dipped beam and main beam light distribution. To this end, the light outlet surfaces of the light guide elements are often kept smaller in the central region than at the edge.

The object of the present invention is to cost-effectively minimise the occurrence of the above-described interfering distortion, without detriment to the efficiency of the optical system.

This object is achieved with a lighting device of the type described in the introduction in that the totality of light guide elements of the at least one line have a common border which is constantly curved on at least one face oriented substantially along the axis direction and together with the support layer forms a section curve with a curved curve course.

Thanks to the invention it is possible, by means of a technically simple and cost-saving measure, to dispense for example with the use of diaphragms arranged ahead, since both the light guidance from the light source to the Petzval plane of the optical imaging system and the sought compensation of the distortion brought about by the optical imaging system are implemented in the same component—specifically the primary optical system. In addition, the efficiency of the headlamp is not reduced.

The primary optical system thus comprises both the function of a light guide and that of a distortion reduction means and is provided in the construction phase within the same component. The primary optical system is preferably manufactured as an injection moulded silicone part. This component is preferably mechanically soft and is held in form and position by a further supporting structure, which usually corresponds to a negative of the light element made of a hard material. Both lighting element and supporting structure can be produced easily and economically by means of injection moulding.

A further advantage of the invention lies in the fact that the desired minimisation of the distortion is performed on a broad scale by use of a predistortion, that is to say diffraction effects are produced in equal measure for all spectral components of the used light, and no interfering diffraction effects are produced.

It is particularly advantageous if the lines are arranged horizontally or vertically oriented in the installed position in the vehicle, so as to assist the formation of suitable light distributions.

The totality of light guide elements have a common border, at least for one line, which border is constantly curved on at least one face oriented substantially along the axis direction and together with the support layer forms a section curve with a curved curve course, wherein the axis direction can be oriented both in the horizontal and vertical direction, depending on the installed position in the vehicle.

In one embodiment the aforesaid curve course consequently can be formed both in the axis direction, usually horizontally, and in the direction orthogonal thereto, usually vertically, in other words, in the case of a rectangular arrangement of a plurality of lines each having a plurality of rows, a corresponding border can be formed on four sides of the totality of the light guide elements.

In an advantageous embodiment the headlamp comprises a plurality of parallel lines, which generate joint or also independent light images. Here, a plurality of horizontal rows of illumination arranged vertically one above the other which enable different light images of the headlamp by selective switching of the individual rows, are provided for example in the case of a horizontal installed position in the vehicle. The individual rows for example have different light guide elements at different distances in order to attain the desired light image.

There are often arranged precisely three rows one above the other. With an arrangement of this kind, the upper row can be formed as a forefield row, the middle row can be formed as an asymmetry row, and the lowermost road can be formed as a main beam row.

Since in particular the external contour of the primary optical system of the headlamp has an unfavourable influence on the light image, it is often sufficient if all lines of the primary optical system form a common border which is constantly curved on at least one face oriented in the axis direction and together with the support layer forms a section curve with a curved curve course. The construction is simplified by this step.

The curve course of the border is dependent on the position and dimensions of the illumination row above the projection axis of the optical imaging system. The uppermost illumination row experiences the strongest distortion and must therefore be corrected to the greatest extent by a suitable border. The row disposed closest to the projection axis of the optical imaging system experiences the smallest distortion and is often minimal, such that compensation can be spared.

In principle, a curved curve course of each individual illumination row is expedient in order to minimise the distortion by the optical imaging system. If a plurality of rows are active simultaneously, as is usually conventional in the case of matrix headlamps, a corresponding distortion reduction is consequently a proven method. Since the distortion of the centrally arranged illumination rows, however, is not apparent at the edges of the overall light image, a curved curve course is nevertheless often spared in the border in order to simplify the construction. In addition, the magnitude of the undesirable distortion close to the projection axis, i.e. at the centrally arranged rows, is smaller. If a particular homogeneity of the light image is desired, a curve course according to the invention is also expedient at centrally arranged illumination rows.

It is favourable if the curve course for reduction of the distortion follows a cosine function. For this purpose, the shape of a segment of a circle or segment of an ellipse can also be applied as curve course in the construction of the primary optical system in order to attain a similar effect.

A particularly simple realisation of the curve course in the construction phase, i.e. in the design of the light guide elements, is thus made possible, since the cosine function in the small angular range corresponds substantially to the segment of a circle and can be realised particularly easily from a structural point of view.

In principle, a free-form curve course of the border is expedient in order to attain special light distributions together with optical imaging systems, in particular if the optical imaging systems have distortions of a higher order. For example, a freeform curve course can be a freely shaped line, such as a circular arc with curvature increasing outwardly from the middle of a line.

The reduction of the distortion is particularly efficient if the curve course is provided in accordance with a predefined provision for the measurement of the distortion of an optical imaging system, for example DIN ISO 9039.

In an advantageous embodiment of the headlamp the border on each side forms a curve course, and both curved curve courses jointly form a convex shape.

It is favourable if each light guide element or the associated light inlet surface is assigned at least one light source.

In principle, each row can have a different number of lighting elements, and the horizontal distances between the individual lighting elements as well as the geometries of the light guide elements can also be different.

The greatest possible versatility in the design of the headlamp is achieved if each light guide element is assigned an illumination element. This versatility, however, entails higher costs accordingly, and is not always required.

Figure 2:
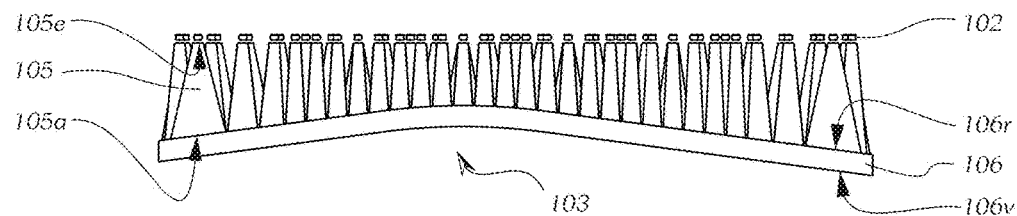
Figure 3:
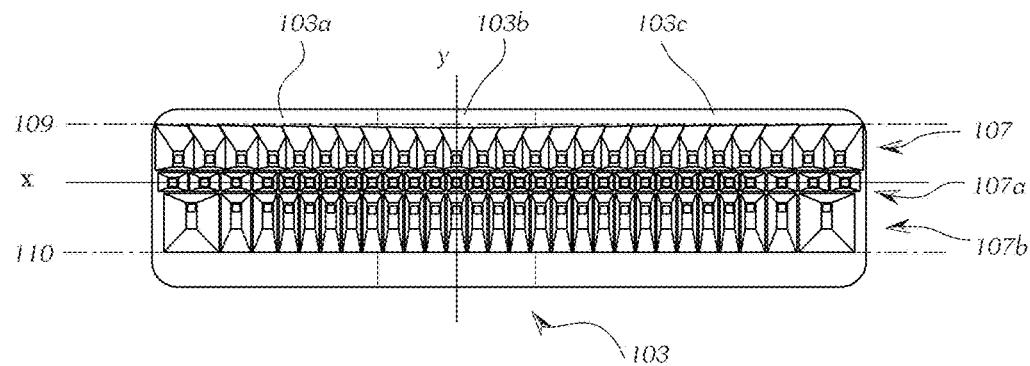
Figure 4:
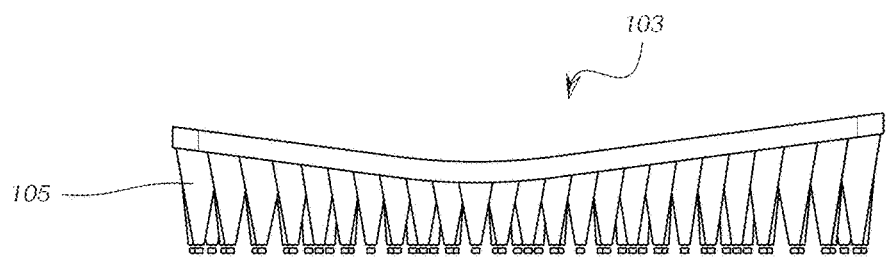
Figure 5:
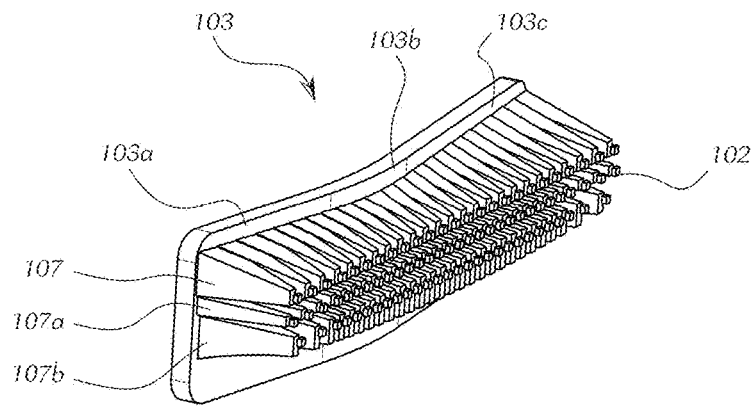

The invention and advantages thereof will be described in greater detail hereinafter with reference to non-limiting examples, which are illustrated in the accompanying drawings, in which FIG. 1: shows a perspective exploded view of a vehicle headlamp according to the prior art, FIG. 2: shows a view of a primary optical system from below according to the prior art, FIG. 3: shows a view of a primary optical system from behind according to the prior art, FIG. 4: shows a view of the primary optical system of FIG. 3 from above, FIG. 5: shows a perspective view of the primary optical system of FIGS. 3 and 4, FIG. 6: shows an illustration of the light image of a headlamp according to the prior art, FIG. 7: shows a perspective exploded view of the vehicle headlamp according to the invention, FIG. 8: shows a view of the primary optical system according to the invention from behind, FIG. 9: shows a view of the primary optical system of FIG. 8 from above, and FIG. 10: shows an illustration of a light image that can be attained with a headlamp according to the invention.

With reference to FIG. 1 an exemplary embodiment of the invention will now be explained in greater detail. In particular, the parts important for a headlamp according to the invention are illustrated, wherein it is clear that a headlamp also contains many other parts which enable an expedient use in a motor vehicle, such as a passenger car or motorbike in particular.

In FIG. 1 a headlamp 101 according to the prior art for a vehicle comprising at least one light source 102, a primary optical system 103 for generating a lighting image, and an optical imaging system 104 is illustrated by way of example, wherein the lighting image can be projected in the form of a light image onto the roadway by means of the optical imaging system 104, wherein the projection is performed in the direction of the optical axis z onto the roadway and the lines are arranged horizontally or vertically oriented in the installed position in the vehicle.

The primary optical system 102 according to the prior art in FIG. 2 to FIG. 5 has a plurality of light guiding elements 105, wherein each light guiding element 105 has a light inlet surface 105e for coupling in light from at least one light source 102, which light is emitted for example from an LED, and each light guiding element 105 has a light outlet surface 105a for coupling out light.

The primary optical system 102 comprises a plurality of light guiding elements 105, which are arranged adjacently to one another or in an overlapping manner in a row in an axis direction x and form a line 107, wherein the primary optical system 103 has a plurality of light guiding elements 105 and a support layer 106, wherein the light guiding elements 105 are arranged on a rear face 106r of the support layer 106 and the primary optical system 103 comprises three parallel lines 107, 107a and 107b arranged vertically one above the other, and this arrangement forms three horizontally adjacent regions 103a, 103b and 103c.

The light outlet surfaces 105a of horizontally adjacent light guiding elements 105, starting from the centrally arranged region 103b, have an increasing size of the outlet surfaces 104a towards the two ends 103a and 103c.

The light outlet surfaces 105a are usually larger than the corresponding light inlet surfaces 105e of the corresponding light guiding element 105.

The lighting image can be produced on the front side 106v of the support layer 106, in which the Petzval plane of the optical imaging system 103 is arranged and projects the generated overall lighting image as light image in front of the vehicle.

In principle, the shapes of the light inlet surfaces 105e and light outlet surfaces 105a of the light guide elements 105 are freely selectable, but are usually round or rectangular or square. The particular shape is dependent on the desired application—for example as main beam—i.e. the radiation characteristics of the light from the individual light guiding element. The longitudinal shape of the light guiding element 105 also has a number of degrees of freedom in respect of its shaping, wherein a straight—funnel-shaped—or also a curved course is often used.

Figure 6:
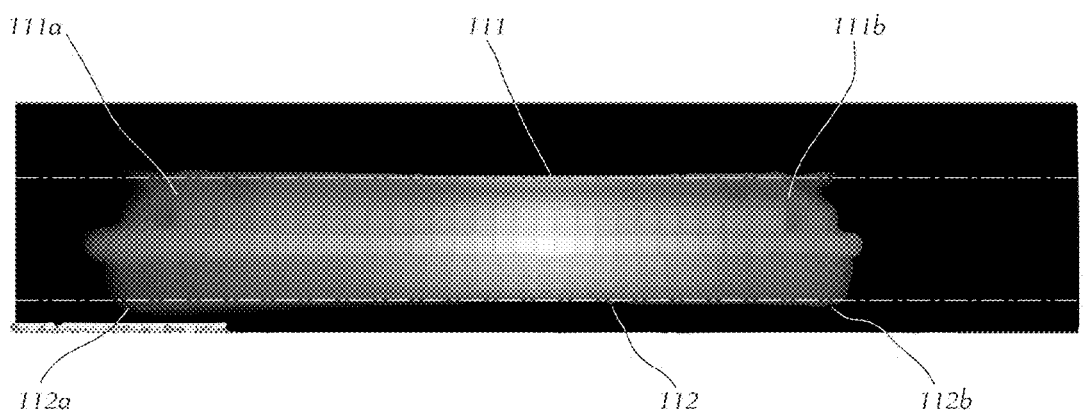

FIG. 6 shows the light image generated by the headlamp according to the prior art, in which distortions 111a and 111b—a cushion-like distortion or what is known as a "wing"—can be seen in the top left and top right corners respectively. The lower edge 112 of the light image also has vertical curvatures 112a and 112b (likewise a cushion-like distortion) running from the central region 103b towards the edges 103a and 103c respectively, which can be seen in the projected light image in front of the vehicle and forms an interfering effect.

Figure 7:
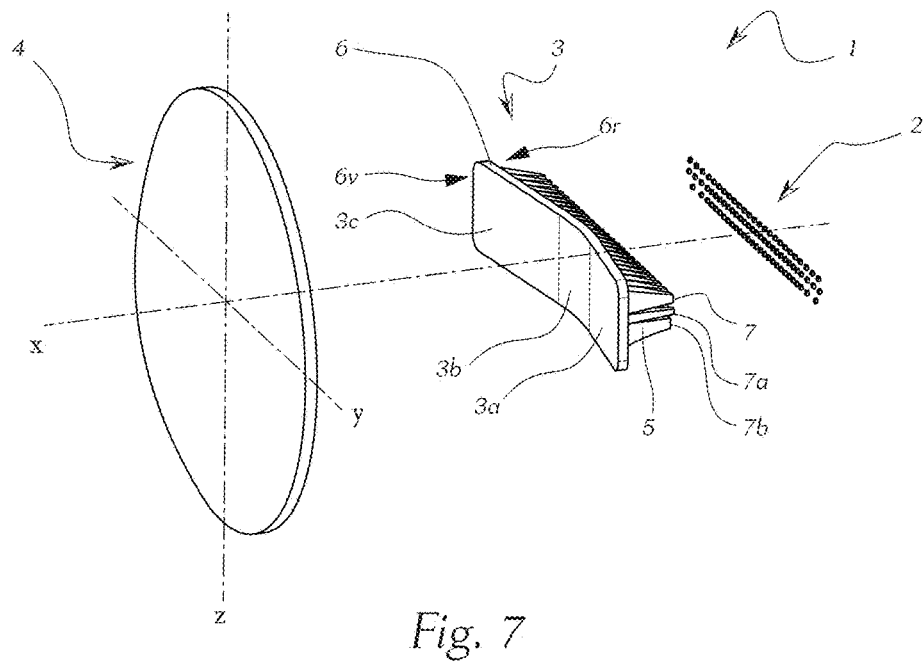

FIG. 7 shows an example of a headlamp 1 according to the invention for a vehicle comprising at least one light source 2, a primary optical system 3 for generating a lighting image, and an optical imaging system 4, wherein the lighting image can be projected in the form of a light image onto the roadway by means of the optical imaging system 4, and the lines are arranged horizontally or vertically oriented in the installed position in the vehicle.

Figure 8:
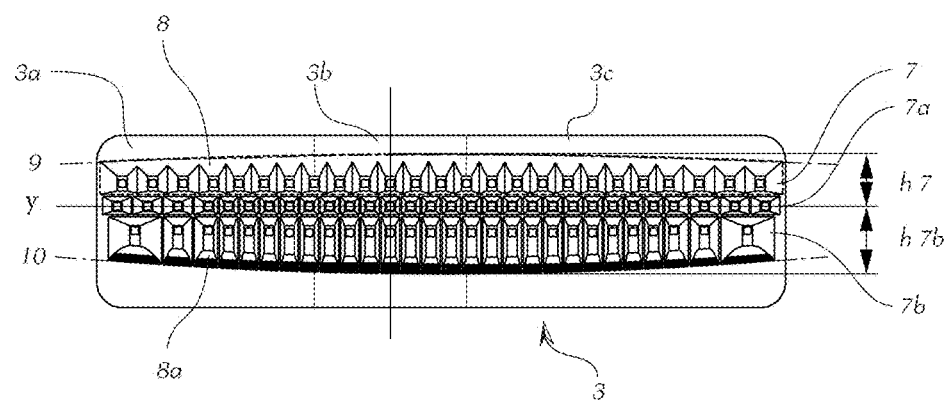
Figure 9:
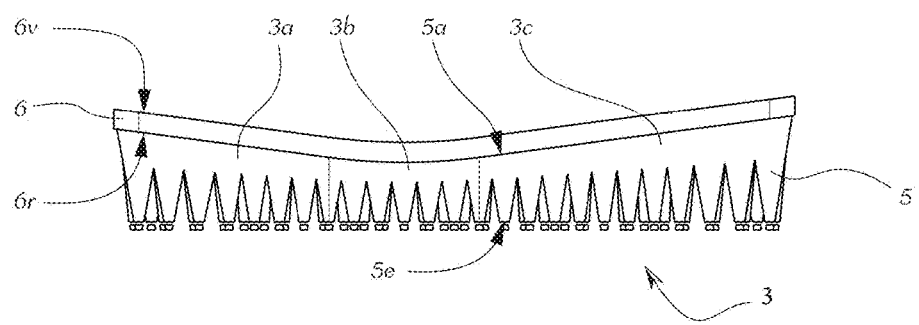

The primary optical system 2 according to the invention in FIG. 8 and FIG. 9 has a plurality of light guiding elements 5, wherein each light guiding element 5 has a light inlet surface 5e for coupling in light from at least one light source 2, which for example is emitted from an LED, and each light guiding element 5 has a light outlet surface 5a for coupling out light.

The primary optical system 2 comprises a plurality of light guiding elements 5 which are arranged adjacently to one another or in an overlapping manner in a row in an axis direction y and form a line 7, wherein the primary optical system 3 has a plurality of light guiding elements 5 and a support layer 6, wherein the light guiding elements 5 are arranged on a rear face 6r of the support layer 6 and the primary optical system 3 comprises three parallel lines 7, 7a and 7b arranged vertically one above the other, and this arrangement forms three horizontally adjacent regions 3a, 3b and 3c.

The lighting image can be produced on the front side 6v of the support layer 6, in which the Petzval plane of the optical imaging system 3 is arranged and projects the generated overall lighting image as light image in front of the vehicle.

The totality of light guiding elements 5 of the lines 7, 7a and 7b additionally have a common border 8a, which is constantly curved on at least one face oriented substantially along the axis direction y and together with the support layer 6 forms a section curve with a curved curve course 9 or 10.

The curvature of the curves 9 and 10 preferably follows a cosine depending on the optical imaging system used, but can also be formed as a segment of a circle or segment of an ellipse in order to facilitate the construction. More complex curve courses for reducing the distortion are not shown here, but are also conceivable if the optical imaging system generates distortions of higher order. The severity of the curvature can be dependent on the vertical distance $h_7$ or $h_{7b}$ of the horizontal row from the horizontal axis.

Figure 10:
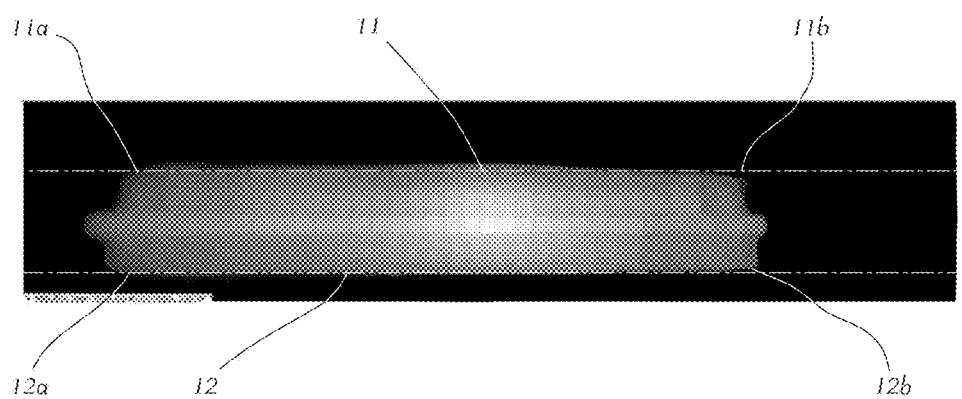

The improved light image with the practically straight lines 11 and 12 is shown in FIG. 10. The corners 11a, 12a, 11b and 12b, compared to the light image according to the prior art in FIG. 6, lie much further within the desired limits, with no manifestation of the "wings".

LIST OF REFERENCE SIGNS 1, 101 headlamp
2, 102 light source
3, 103 primary optical system
3a, 103a end region of the primary optical system, front right view
3b, 103b middle region of the primary optical system
3c, 103c end region of the primary optical system, front left view
4, 104 optical imaging system
5, 105 light guiding element
5a, 105a light outlet surface of a light guiding element
5e, 105e light inlet surface of a light guiding element
6, 106 support layer
6r, 106r rear face of the support layer
6v, 106v front face of the support layer
7, 107 upper row of the light guiding elements
7a, 107a middle row of the light guiding elements
7b, 107b lower row of the light guiding elements
8 common border of a line
8a common border of all lines
9, 109 line through contour of the upper delimitation
10, 110 line through contour of the lower delimitation
11, 111 line through distortion of the upper delimitation of the light image
11a, 11b, 111a, 111b corner region of the upper distortion of the light image
12, 112 line through distortion of the lower delimitation of the light image
12a, 12b, 112a, 112b corner region of the lower distortion of the light image
$h_7$, $h_{7b}$ vertical distance of the horizontal row from the horizontal axis x

The invention claimed is:

1. A headlamp (1) for a vehicle, comprising:
at least one light source (2);
a primary optical system (3) for generating a lighting image; and
an optical imaging system (4) configured to project the lighting image onto a roadway as a light image,
wherein the primary optical system (3) has a plurality of light guiding elements (5) and a support layer (6), wherein the light guiding elements (5) are arranged on a rear face (6r) of the support layer (6), and the lighting image can be generated on a front face (6v) of the support layer (6),
wherein the light guiding elements (5) are arranged adjacently to one another or in an overlapping manner in a row in an axis direction (y) and form at least one line (7), wherein each light guiding element (5) has a light inlet surface (5e) for coupling in light from at least one light source (2) and a light outlet surface (5a) for coupling out light, and
wherein the totality of the light guiding elements (5) of the at least one line (7) have a common border (8) which is constantly curved on at least one face oriented substantially along the axis direction (y) and together with the support layer (6) forms a section curve with a curved curve course (9, 10).

2. The headlamp (1) according to claim 1, wherein the headlamp (1) comprises a plurality of parallel lines (7, 7a, 7b).

3. The headlamp (1) according to claim 2, wherein the lines (7, 7a, 7b) are arranged horizontally or vertically oriented in an installed position in the vehicle.

4. The headlamp (1) according to claim 2, wherein all lines (7, 7a, 7b) form a common border (8a), which is constantly curved on at least one face oriented in the axis direction (y) and together with the support layer (6) forms a section curve with a curved curve course (9, 10).

5. The headlamp (1) according to claim 1, wherein the curve course (9, 10) follows a cosine function.

6. The headlamp (1) according to claim 1, wherein the curve course (9, 10) is a segment of a circle.

7. The headlamp (1) according to claim 1, wherein the curve course (9, 10) is a segment of an ellipse.

8. The headlamp (1) according to claim 1, wherein the curve course (9, 10) is a freely shaped line.

9. The headlamp (1) according to claim 1, wherein the curve course (9, 10) is a freely shaped line corresponding to a segment of a circle with increasing curvature.

10. The headlamp (1) according to claim 1, wherein the border (8, 8a) forms a curve course (9, 10) on each of two faces and both curved curve courses (9, 10), considered jointly, form a convex shape.

11. The headlamp (1) according to claim 1, wherein at least one light source (2) is assigned to each light guiding element (5) or the associated light inlet surface (5e).

* * * * *